United States Patent Office 3,373,016
Patented Mar. 12, 1968

3,373,016
BRAZING ALLOY
Edward R. Roeder and Ernst G. Huschke, Jr., Canoga Park, Calif., assignors to North American Aviation, Inc.
No Drawing. Filed Sept. 20, 1965, Ser. No. 488,745
2 Claims. (Cl. 75—173)

This invention relates to a new alloy. More specifically, the invention relates to a novel brazing composition.

The invention described herein was made in the performance of work under a NASA contract and is subject to the provisions of the National Aeronautics and Space Act of 1958, Public Law 85–568 (72 Stat. 426; 42 U.S.C. 2451), as amended.

The herein invention relates to an area of brazing alloys which are particularly used in manual applications. These alloys are used in brazing by hand-held manually operated torches, as compared to the brazing alloys that are utilized in furnace applications. In the field of brazing alloys improvement was sought in obtaining alloys that did not cause stress cracking of the various base metal combinations with which the alloy was used. Additionally, it was desired to overcome joint or crevice corrosion. In addition to cracking immunity and corrosion resistance, it is important that the brazing alloy have good flow characteristics on the base material. The combination of these features was not preivously available in the state of the art. Of particular interest is an alloy possessing the above properties for use on stainless steel which is often used in environments subject to corrosion and the like. All of the previous available alloys tested for manual torch brazing exhibited the tendency to stress crack the base stainless steel metal. The only known alloy that could approach the desired qualities in the prior art was one containing 50 percent gold which is extremely expensive for most commercial applications where a significant quantity of the brazing alloy is to be used. Thus the need for an alloy that would possess the same properties at a much lower cost can be readily appreciated.

Thus an object of this invention is to provide a brazing alloy having excellent resistance to stress cracking when applied to stainless steel base metal.

Another object of the invention is to provide a brazing alloy which has good corrosion resistance when applied to stainless steel base metal.

A further object of the invention is to provide a brazing alloy which is of low cost.

These and other objects of the invention will become apparent from the following detailed description.

The above and other objects of the invention are accomplished by a new brazing alloy containing zinc, copper, nickel, and silver. The range of percentages of the components comprising the new alloy is from 13.5–15.0 weight percent zinc, 0.93–1.25 weight percent copper, 0.70–0.94 weight percent nickel with the balance being silver and incidental amounts of impurities and compatible elements, wherein the ratio of the nickel to copper in the alloy is not less than 0.75:1. The alloy is prepared by conventional melt techniques. The following examples will indicate the superior results obtained using the brazing alloy of the invention.

Example I

The alloy of the instant invention was prepared having the composition of 84.03 weight percent silver, 0.98 weight percent copper, 0.728 weight percent nickel and 14.36 weight percent zinc. To determine the stress cracking potential, elevated temperature tensile tests were performed to provide comparative quantative abilities of base metals comprised of stainless steel 347 and 410 to elongate in the presence of molten brazing alloys in brazing temperature ranges. Standard sheet tensile coupons of the base stainless steel metals having dimensions of .094 x .500 x 2.0 in. reduced section were tested having brazing alloys flowing over the gage lengths. The coupons were then heated and stabilized for ten minutes at the test temperature prior to loading in tension. Tension was applied by standard Baldwin elevated temperature tensile test equipment means. Results of the tests performed on the test samples comparing the elongation results of base metals in the presence of the invented alloy with results from various selected commercial manual brazing alloys are given in the following Table I.

TABLE I

| Braze Alloy Designation | Composition (Wt. Percent) | Testing Temp., °F. | Percent Elongation in 2 in. | |
|---|---|---|---|---|
| | | | 347 CRES | 410 CRES |
| 1 (Control) | | 1,200 | 25 | |
| | | 1,400 | 45 | 20 |
| | | 1,600 | 64 | 79 |
| 2 | 1 Cu, .75 Ni, 15 Zn, Bal. Ag. | 1,400 | 33 | 27 |
| | | 1,500 | 57 | 53 |
| | | 1,600 | 75 | 68 |
| 3 | 63 Ag, 27 Cu, 10 In | 1,385 | 7 | |
| | | 1,485 | 8 | |
| | | 1,585 | 34 | |
| 4 | 61.5 Ag, 24 Cu, 14.5 In | 1,250 | 9 | |
| | | 1,350 | 6 | |
| | | 1,450 | 7 | |
| 5 | 63 Ag, 28.5 Cu, 2.5 Ni, 6 Sn. | 1,425 | 6 | |
| | | 1,525 | 22 | |
| | | 1,625 | 39 | |
| 6 | 40 Ag, 30 Cu, 5 Ni, 25 Zn. | 1,530 | 7 | |
| | | 1,630 | 11 | |
| | | 1,730 | 20 | |
| 7 | 40 Ag, 30 Cu, 2 Ni, 28 Zn. | 1,385 | 4 | |
| | | 1,485 | 3 | |
| | | 1,585 | 11 | |
| 8 | 56 Ag, 22 Cu, 5 Sn, 17 Zn. | 1,155 | 16 | |
| | | 1,255 | 9 | |
| | | 1,355 | 0 | |
| 9 | 75 Ag, 25 Zn | 1,295 | 25 | 25 |
| | | 1,395 | 30 | 45 |
| | | 1,495 | 60 | 64 |
| 10 | 60 Ag, 30 Cu, 10 Sn | 1,275 | 7 | |
| | | 1,375 | 14 | |
| | | 1,475 | 30 | |
| 11 | 25 Ag, 50 Au, 22 Cu, 3 Zn. | 1,435 | 46 | 22 |
| | | 1,535 | 45 | 66 |
| | | 1,635 | 43 | 52 |
| 12 | 50 Ag, 16 Cd, 15.5 Cu, 3 Ni, 15.5 Zn. | 1,220 | 8 | |
| | | 1,320 | 6 | |
| | | 1,420 | 6 | |

As can be seen from this table, the alloy composition 2 of the herein invention exhibited significantly better base metal elongation than with the other compositions. The alloy of composition 9 exhibited properties but as will be later shown did not have corrosion resistance. The alloy of composition 11 additionally showed a good elngation and resistance to stress cracking, yet this composition, as can be seen, contains a significant amount of gold, which as previously indicated, increases the cost significantly over that of the instant composition.

Example II

To determine the corrosion resistance, tests were performed on stainless steel plates 1/16 x 1 x 3 in. with the brazing alloy flowed on by torch. The test plates were exposed for 50 and 100 hours in standard 5 percent salts spray corrosion test equipment, per Federal Test Standard No. 151, Method 811. The plates were then bent at 180° over 1/4 in. radius mandrel and macro examined for interfacial structure to determine any separation from the base metal. The results are seen in Table II.

TABLE II

| Alloy Designation | Composition | 347 CRES, 50 hrs. | 347 CRES, 100 hrs. | 410 CRES,[1] 50 hrs. | 410 CRES,[1] 100 hrs. |
|---|---|---|---|---|---|
| 1 | 1 Cu, .75 Ni, 15 Zn, Bal. Ag. | NS | NS (Fig. 3) | NS | NS |
| 2 | 25 Ag, 50 Au, 22 Cu, 3 Zn | NS | NS (Fig. 2) | NS | NS |
| 3 | 75 Ag, 25 Zn | S | S (Fig. 1) | S | S |

[1] 410 stainless was heat treated prior to preparation by a production thrust chamber furnace braze heat cycle.

Legend
NS = Not separated upon bending 180° over ¼″ radius mandrel after corrosive exposure.
S = Separated upon bending 180° over ¼″ radius mandrel after corrosive exposure.

As can be seen, the alloy of the invention, No. 1 showed no separation with either of the stainless steel base materials at 50 and 100 hour tests. The same results were obtained using the more costly gold base material. However, the silver-zinc alloy which displayed good elongation as shown in Table I exhibited separation in all instances displaying no corrosion resistance.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A brazing alloy comprising:
   from 0.93 to 1.25 weight percent Cu,
   from 0.70 to 0.94 weight percent Ni,
   from 13.5 to 15.0 weight percent Zn,
   and the remainder being Ag and incidental amounts of impurities and compatible elements, wherein the ratio of Ni to Cu is at least .75:1.
2. A brazing alloy comprising:
   1.0 weight percent Cu,
   0.75 weight percent Ni,
   15.0 weight percent Zn,
   and 83.25 weight percent Ag.

References Cited

FOREIGN PATENTS

| | | |
|---|---|---|
| 556,831 | 5/1958 | Canada. |
| 839,610 | 1/1939 | France. |
| 492,779 | 2/1930 | Germany. |
| 110,799 | 5/1935 | Japan. |

CHARLES N. LOVELL, *Primary Examiner.*